United States Patent
Takahashi et al.

(10) Patent No.: US 8,796,938 B2
(45) Date of Patent: Aug. 5, 2014

(54) SWITCHING POWER SUPPLY, LUMINAIRE, AND CONTROL METHOD FOR THE LUMINAIRE

(75) Inventors: Yuji Takahashi, Kanagawa-ken (JP); Noriyuki Kitamura, Kanagawa-ken (JP); Koji Suzuki, Kanagawa-ken (JP); Koji Takahashi, Kanagawa-ken (JP); Toru Ishikita, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 153 days.

(21) Appl. No.: 13/565,493

(22) Filed: Aug. 2, 2012

(65) Prior Publication Data

US 2013/0069548 A1  Mar. 21, 2013

(30) Foreign Application Priority Data

Sep. 20, 2011  (JP) .................. 2011-205335

(51) Int. Cl.
*H05B 37/02* (2006.01)

(52) U.S. Cl.
USPC ............... 315/200 R; 315/209 R; 315/276; 315/287; 315/291

(58) Field of Classification Search
None
See application file for complete search history.

(56) References Cited

U.S. PATENT DOCUMENTS

| 2009/0108769 | A1* | 4/2009 | Ishikita et al. ............... 315/291 |
| 2011/0316494 | A1* | 12/2011 | Kitamura et al. ............ 323/229 |
| 2012/0248999 | A1* | 10/2012 | Kitamura et al. ........ 315/200 R |
| 2012/0249007 | A1* | 10/2012 | Kitamura et al. ............ 315/224 |
| 2013/0002160 | A1* | 1/2013 | Takahashi et al. ....... 315/200 R |
| 2013/0113387 | A1* | 5/2013 | Kitamura et al. ............ 315/224 |
| 2013/0119860 | A1* | 5/2013 | Kitamura et al. ............. 315/51 |

FOREIGN PATENT DOCUMENTS

JP     2004-119078 A     4/2004

* cited by examiner

*Primary Examiner* — Jany Richardson
(74) *Attorney, Agent, or Firm* — Banner & Witcoff, Ltd.

(57) ABSTRACT

A switching power supply includes a switching element, a constant current element, a rectifying element, a first inductor, a second inductor, and a control circuit. If the switching element is on, the switching element supplies a power supply voltage to the first inductor and feeds an electric current. The constant current element turns off the switching element if the electric current of the switching element exceeds a predetermined upper limit. The rectifying element feeds the electric current of the first inductor if the switching element is turned off. The second inductor supplies the induced potential to a control terminal of the switching element. The control circuit supplies a pulse-like potential to a control terminal of the constant current element and outputs if an average of the potential is lower than a lower limit.

20 Claims, 2 Drawing Sheets

SWITCHING POWER SUPPLY, LUMINAIRE, AND CONTROL METHOD FOR THE LUMINAIRE

CROSS-REFERENCE TO RELATED APPLICATIONS

This application is based upon and claims the benefit of priority from the prior Japanese Patent Application No. 2011-205335, filed on Sep. 20, 2011; the entire contents of which are incorporated herein by reference.

FIELD

Embodiments described herein relate generally to a switching power supply, a luminaire, and a control method for the luminaire.

BACKGROUND

In recent years, in a luminaire, more and more illumination light sources are changed from an incandescent lamp and a fluorescent lamp to energy-saving and long-life light sources such as a light-emitting diode (LED). For example, new illumination light sources such as an electro-luminescence (EL) and an organic light-emitting diode (OLED) have been developed. The light output of these illumination light sources depends on a value of a flowing electric current. Therefore, when lighting is lit, a power supply circuit that supplies a constant current is necessary. Further, in order to adjust an input power supply voltage to a rated voltage of an illumination light source such as an LED, it is also necessary to convert the voltage. As a highly-efficient light source suitable for power saving and a reduction in size, a switching power supply such as a DC-DC converter is known. An LED lighting device including a self-excited DC-DC converter is proposed (see, for example, JP-A-2004-119078).

However, in the self-excited DC-DC converter, it is likely that oscillation stops if an output current flowing through an inductor is excessively reduced. Therefore, a dimming range of an illumination light source is sometimes limited.

DETAILED DESCRIPTION

First Embodiment

Figure 1:
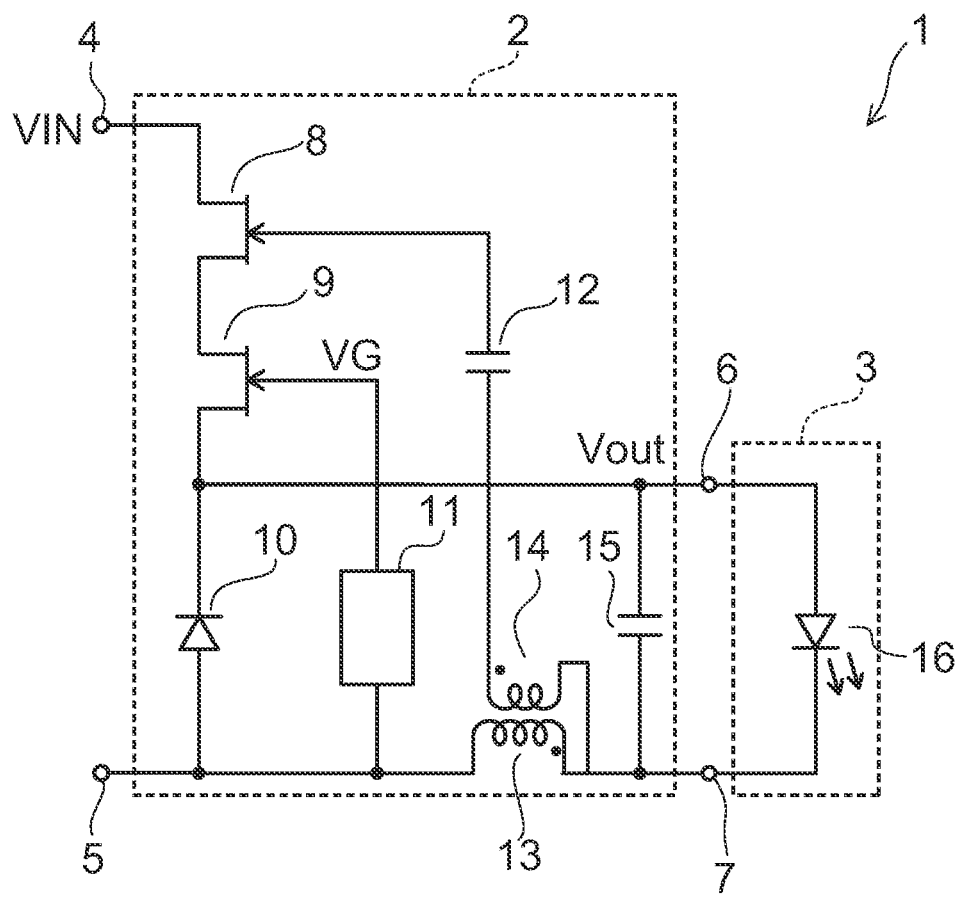
FIG. 1 is a circuit diagram of a luminaire including a switching power supply according to a first exemplary embodiment.

A first embodiment is directed to a switching power supply including a switching element, a constant current element, a rectifying element, a first inductor, a second inductor, and a control circuit. The switching element is configured to supply, if the switching element is on, a power supply voltage to the first inductor and feed an electric current. The constant current element is connected in series to the switching element and configured to turn off the switching element if the electric current of the switching element exceeds a predetermined upper limit. The rectifying element is connected in series to the switching element or the constant current element and configured to feed the electric current of the first inductor if the switching element is turned off. The second inductor is magnetically coupled to the first inductor and configured to have induced therein potential for turning on the switching element if the electric current of the first inductor increases, have induced therein potential for turning off the switching element if the electric current of the switching element decreases, and supply the induced potential to a control terminal of the switching element. The control circuit is configured to supply the potential to a control terminal of the constant current element and output, if an average of the potential is lower than a lower limit for enabling the switching element to continue switching, pulse-like potential that repeats a period in which a potential value equal to or higher than the lower limit is output and a period in which a potential value lower than the lower limit is output.

Second Embodiment

A second embodiment is directed to the switching power supply according to the first embodiment, wherein the switching element is a normally-on element.

Third Embodiment

A third embodiment is directed to the switching power supply according to the first or second embodiment, wherein the control circuit outputs, if an average of generated potential is equal to or higher than the lower limit, pulse-like potential that repeats a period in which a potential value higher than the average is output and a period in which a potential value lower than the average is output.

Fourth Embodiment

A fourth embodiment is directed to the switching power supply according to the first or second embodiment, wherein the control circuit outputs direct-current potential if an average of output potential is higher than the lower limit.

Fifth Embodiment

A fifth embodiment is directed to a luminaire including the switching power supply according to any one of the first to fourth embodiment and a lighting load connected as a load circuit of the switching power supply.

Exemplary embodiments are explained in detail below with reference to the accompanying drawings. In this specification and the drawings, components same as those already explained with reference to the drawings are denoted by the same reference numerals and signs and detailed explanation of the components is omitted as appropriate.

First, a first exemplary embodiment is explained.

Figure 2:
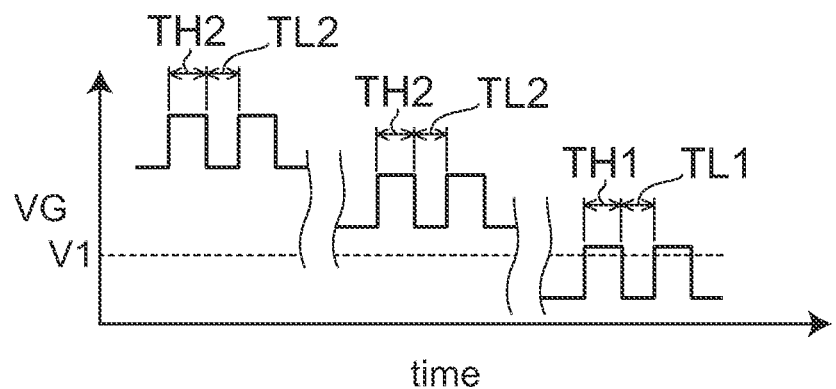
FIG. 2 is a waveform chart of an output signal of a control circuit in the first exemplary embodiment.

FIG. 1 is a circuit diagram of a luminaire including a switching power supply according to the first exemplary embodiment. FIG. 2 is a waveform chart of an output signal of a control circuit in the first exemplary embodiment.

As shown in FIG. 1, a luminaire 1 includes a switching power supply 2 that drops an input direct-current power supply voltage VIN to a voltage VOUT and a lighting load 3 functioning as a load circuit of the switching power supply 2. The lighting load 3 includes an illumination light source 16. The illumination light source 16 includes, for example, an LED. The illumination light source 16 receives the supply of the voltage VOUT from the switching power supply 2 to be lit.

In the switching power supply 2, a switching element 8 and a constant current element 9 are connected in series between a high-potential power supply terminal 4 and a high-potential output terminal 6. A drain of the switching element 8 is connected to the high-potential power supply terminal 4. A source of the switching element 8 is connected to a drain of the constant current element 9. A source of the constant current element 9 is connected to the high-potential output terminal 6. The switching element 8 and the constant current element 9 are, for example, field effect transistors (FETs) such as high electron mobility transistors (HEMTs) and are normally-on elements.

A rectifying element 10 is connected between the high-potential output terminal 6 and a low-potential power supply terminal 5 with a forward direction set in a direction from the low-potential power supply terminal 5 to the high-potential output terminal 6. In other words, the rectifying element 10 is connected in series to the constant-current element 9. The rectifying element 10 is a diode such as a Schottky barrier diode (SBD).

A control circuit 11 outputs an output signal VG to a gate functioning as a control terminal of the constant current element 9.

As shown in FIG. 2, the control circuit 11 generates a pulse-like output signal VG having a period TH1 in which potential is relatively high and a period TL1 in which potential is relatively low. The output signal VG is a signal that can keep constant a potential difference between the potential in the period TH1 and the potential in the period TL1 and change an average of the potentials. The control circuit 11 can generate the output signal VG by combining an output of a pulse generating circuit, which generates a rectangular wave having amplitude corresponding to the potential difference, with potential corresponding to the average. In FIG. 2, the average of the potentials is shown concerning three different cases. The output signal VG can be formed to change the average of the potentials by changing a potential value in the period TH1, a potential value in the period TL1, and the periods TH1 and TL1.

In the switching power supply 2, a first inductor 13 is connected between the low-potential power supply terminal 5 and a low-potential output terminal 7. The first inductor 13 is connected in series to the switching element 8 and the constant current element 9 via the lighting load 3. A second inductor 14 is magnetically coupled to the first inductor 13. One end of the second inductor 14 is connected to the low-potential output terminal 7. The other end of the second inductor 14 is connected to a gate functioning as a control terminal of the switching element 8 via a capacitor 12.

A smoothing capacitor 15 is connected between the high-potential output terminal 6 and the low-potential output terminal 7.

The operation of the switching power supply 2 is explained.

(1) When the power supply voltage VIN is supplied between the high-potential power supply terminal 4 and the low-potential power supply terminal 5, since the switching element 8 and the constant current element 9 are the normally-on elements, both of the switching element 8 and the constant current element 9 are on. An electric current flows through a route of the high-potential power supply terminal 4, the switching element 8, the constant current element 9, the smoothing capacitor 15, the first inductor 13, and the low-potential power supply terminal 5. The smoothing capacitor 15 is charged. The voltage at both ends of the smoothing capacitor 15, i.e., the voltage between the high-potential output terminal 6 and the low-potential output terminal 7 is supplied to the illumination light source 16 of the lighting load 3 as the output voltage VOUT of the switching power supply 2. Since the switching element 8 and the constant current element 9 are on, a voltage nearly equal to the power supply voltage VIN is applied to both the ends of the rectifying element 10. The rectifying element 10 is reverse-biased and the electric current does not flow.

(2) If the output voltage VOUT reaches a predetermined voltage, the electric current flows to the illumination light source 16 and the illumination light source 16 is lit. At this point, the electric current flows through a route of the high-potential power supply terminal 4, the switching element 8, the constant current element 9, the smoothing capacitor 15 and the illumination light source 16, the first inductor 13, and the low-potential power supply terminal 5. For example, if the illumination light source 16 is an LED, the predetermined voltage is a voltage in the forward direction of the LED and is set according to the illumination light source 16.

(3) The power supply voltage VIN is supplied to the first inductor 13 via the switching element 8 and the constant current element 9. Therefore, the electric current flowing through the first inductor 13 increases. The second inductor 14 is magnetically coupled with the first inductor 13 in polarity shown in the figure. Therefore, an electromotive force having polarity with high potential set on the capacitor 12 side is induced in the second inductor 14. Therefore, potential positive with respect to the source of the switching element 8 is supplied to the gate of the switching element 8 via the capacitor 12. The switching element 8 is maintained on.

(4) If the electric current flowing through the constant current element 9 including the FET reaches a saturated current value determined by the gate-to-source voltage, a drain-to-source voltage of the constant current element 9 suddenly rises. Therefore, the gate-to-source voltage of the switching element 8 falls to be lower than a threshold voltage and the switching element 8 is turned off.

(5) The first inductor 13 continues to feed the electric current through a route of the rectifying element 10, the smoothing capacitor 15 and the lighting load 3, and the first inductor 13. Therefore, the illumination light source 16 continues the lighting. Since the first inductor 13 discharges electromagnetic energy, the electric current of the first inductor 13 decreases. Therefore, an electromotive force having polarity with low potential set on the capacitor 12 side is induced in the second inductor 14. Potential negative with respect to the source of the switching element 8 is supplied to the gate of the switching element 8 via the capacitor 12. The switching element 8 is maintained off.

(6) If the electromagnetic energy accumulated in the first inductor 13 decreases to zero, the electric current flowing through the first inductor 13 decreases to zero. The direction of the electromotive force induced in the second inductor 14 is reversed again and an electromotive force for setting high potential on the capacitor 12 side is induced. Consequently, potential higher than the potential of the source of the switching element 8 is supplied to the gate of the switching element 8 and the switching element 8 is turned on. Consequently, the switching power supply 2 returns to the state of (2).

Thereafter, the switching power supply 2 repeats (2) to (6). Consequently, the switching to on and off of the switching element 8 is automatically repeated. The output voltage VOUT, which is obtained by dropping the power supply voltage VIN, is supplied to the illumination light source 16. The electric current supplied to the illumination light source 16 changes to a constant current with an upper limit limited by the constant current element 9. Therefore, it is possible to stably light the illumination light source 16.

The switching power supply 2 can adjust the upper limit by changing the potential of the output signal VG of the control circuit 11 and can perform dimming by adjusting the electric current flowing to the illumination light source 16.

Figure 3:
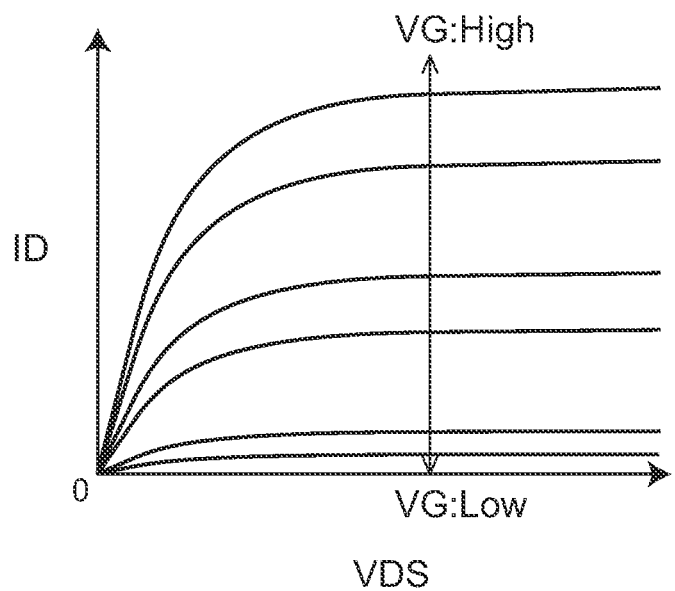
FIG. 3 is a characteristic chart for explaining dependency of the electric current of a constant current element on the potential of a control terminal.

FIG. 3 is a characteristic chart for explaining dependency of the electric current of the constant current element on the potential of the control terminal.

In FIG. 3, a drain-to-source voltage VDS of the constant current element 9 including the FET is plotted on the abscissa, a drain current ID is plotted on the ordinate, and dependency of the drain current is represented using the potential of the output signal VG as a parameter.

The saturated current value, i.e., the upper limit of the electric current can be adjusted by changing the potential of the output signal VG to change the gate potential of the constant current element 9. For example, the upper limit of the drain current ID can be increased to increase the electric current flowing through the illumination light source 16 by raising the potential of the output signal VG (in a direction of VG:High in FIG. 3). As a result, the light output of the illumination light source 16 increases. The upper limit of the drain current ID can be reduced to reduce the electric current flowing through the illumination light source 16 by lowering the potential of the output signal VG (in a direction of VG:Low in FIG. 3). As a result, the light output of the illumination light source 16 decreases.

However, if the potential of the output signal VG is too low, in some case, the electromotive force induced in the second inductor 14 falls and the switching element 8 cannot be turned on again. In other words, there is a lower limit V1 for the potential of the output signal VG for turning on the switching element 8 again to enable the switching power supply 2 to continue the oscillation.

Therefore, the control circuit 11 generates the pulse-like output signal VG having the period TH1 in which potential is relatively high at a value equal to or higher than the lower limit V1 and the period TL1 in which potential is relatively low and supplies the output signal VG to the gate of the constant current element 9. The periods TH1 and TL1 are set longer than an oscillation period T of the switching power supply 2 and set to be repeated at a time interval of a degree undetectable by human eyes.

In the period TL1, if the potential of the output signal VG falls below the lower limit V1, the switching power supply 2 stops the oscillation. However, the potential of the output signal VG in the period TH1 is set to a value equal to or higher than the lower limit V1. Therefore, the switching power supply 2 can oscillate in the period TH1 and supply the electric current to the illumination light source 16.

Specifically, if the control circuit 11 reduces the average of the potential of the output signal VG, the switching power supply 2 intermittently oscillates. As a result, an average of the electric current flowing through the illumination light source 16 falls below an electric current corresponding to the lower limit V1 of the potential of the output signal VG.

If the control circuit 11 increases the average of the potential of the output signal VG to be higher than the lower limit V1, the switching power supply 2 continuously oscillates.

If the average of the potential of the output signal VG is equal to or higher than the lower limit V1, the control circuit 11 outputs potential changing in a pulse shape that repeats a period TH2 in which a potential value higher than the average is output and a period TL2 in which a potential value lower than the average is output. The periods TH2 and TL2 are set longer than the oscillation period T of the switching power supply 2 and set to be repeated at a time interval of a degree undetectable by human eyes. If the average of the potential of the output signal VG is equal to or higher than the lower limit V1, the periods TH2 and TL2 may be changed according to the average of the potential of the output signal VG.

Effects of this embodiment are explained.

In this embodiment, the control circuit 11 generates the pulse-like output signal VG having the period TH1 in which potential is relatively high and the period TL1 in which potential is relatively low and supplies the output signal VG to the gate of the constant current element 9. As a result, if the average of the gate potential falls below the lower limit V1 for enabling the switching power supply 2 to continue oscillation, the switching power supply 2 can intermittently oscillate and supply the electric current to the illumination light source 16. Therefore, it is possible to expand an adjustment range of the electric current flowing through the illumination light source 16. In other words, it is possible to expand a dimming range of the illumination light source 16.

The control circuit 11 can adjust the average of the potential of the output signal VG by changing a ratio of the periods TH1 and TL1. If the average of the potential of the output signal VG falls below the lower limit V1, it is possible to change the average of the electric current flowing through the illumination light source 16 and dim the illumination light source 16. The periods TH1 and TL1 are set to be repeated at the time interval of the degree undetectable by human eyes. Therefore, there is no influence such as flickering.

Further, if HEMTs are used as the elements such as the switching element 8 and the constant current element 9, a high-frequency operation is possible. For example, an operation in megahertz order is possible. As a result, it is possible to further reduce the periods TH1 and TL1 in the output signal VG of the control circuit 11, further expand the adjustment range of the average of the electric current flowing to the illumination light source 16, and further expand the dimming range. In particular, if GaN HEMTs are used, a higher-frequency operation is possible and it is possible to further expand the dimming range.

Figure 4:
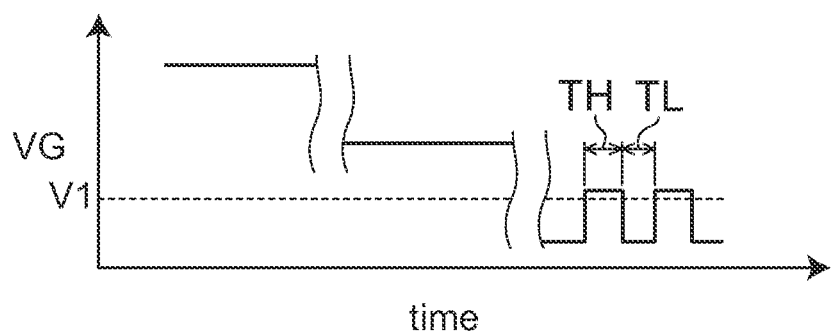
FIG. 4 is a waveform chart of an output signal of a control circuit in a second exemplary embodiment.

FIG. 4 is a waveform chart of an output signal of a control circuit in the second exemplary embodiment.

As shown in FIG. 4, this embodiment is different from the first exemplary embodiment in the output signal VG of the control circuit. Specifically, in this embodiment, the control circuit that generates the output signal VG shown in FIG. 4 is provided instead of the control circuit 11 in the first exemplary embodiment. Components other than the control circuit for a switching power supply and a luminaire according to this embodiment are the same as the components shown in FIG. 1.

If the average of the potential of the output signal VG falls below the lower limit V1, like the control circuit 11 in the first exemplary embodiment, the control circuit in this embodiment generates a pulse-like output signal VG having a period TH in which potential is relatively high and a period TL in which potential is relatively low. The control circuit in this embodiment is different from the control circuit 11 in the first exemplary embodiment in that the control circuit outputs direct-current potential as the output signal VG if the average of the potential of the output signal VG is equal to or higher than the lower limit V1. The periods TH and TL are set longer than the oscillation period T of the switching power supply 2 and set to be repeated at a time interval such that the interval is undetectable by human eyes.

If the potential of the output signal VG is equal to or higher than the lower limit V1, the oscillation of the switching power supply is unlikely to stop. Therefore, unlike the control circuit 11 in the first exemplary embodiment, it is unnecessary to generate the pulse-like output signal VG and supply the output signal VG to the gate of the constant current element 9. If the average of the potential of the output signal VG is equal to or higher than the lower limit V1, the control circuit in this embodiment outputs direct-current potential as the output signal VG. Therefore, it is possible to suppress a maximum of the electric current flowing through the illumination light source 16.

Components, operations, and effects other than those explained above in this embodiment are the same as the components, the operations, and the effects in the first exemplary embodiment.

The embodiments are explained above with reference to the specific examples. However, the present invention is not limited to the embodiments and various modifications are possible.

For example, in FIG. 1, the control circuit 11 is connected between the gate of the constant current element 9 and the low-potential power supply terminal 5 and configured to generate the output signal VG with respect to the potential of the low-potential power supply terminal 5. However, the control circuit 11 may be connected between the gate and the source of the constant current element 9 and configured to generate the output signal VG with respect to source potential.

The control circuit 11 generates the output signal VG, the potential of which steeply changes in a pulse shape between the period TH1 and the period TL1, between the period TH2 and the period TL2, and the period TH and the period TL. However, the potential of the output signal VG may be gently changed in a sine waveform. Further, the control circuit 11 generates the output signal VG, a potential difference of which between the potential in the period TH1 and the potential in the period TL1 or TL is fixed and an average of the potentials of which is variable. However, the control circuit 11 may generate the output signal VG, the average of the potentials of which is set variable by fixing the potential in the period TL1 or TL and changing the potential in the period TH1 or TH in a range of potential equal to or higher than the lower limit V1.

In the examples explained in the first and second exemplary embodiments, the switching element 8 and the constant current element 9 are the normally-on elements. However, the present invention is not limited to this. The switching element 8 and the constant current element 9 may be normally-off elements. In this case, when the supply of the power supply voltage VIN is started, a start-up circuit for starting up the switching power supply 2 is necessary.

The configuration of the switching power supply is not limited to the configuration shown in FIG. 1. For example, the first inductor 13 only has to be present in a route of the high-potential power supply terminal 4, the switching element 8, the constant current element 9, the smoothing capacitor 15, and the low-potential power supply terminal 5. The first inductor 13 may be connected between a connection point of the constant current element 9 and the rectifying element 10 and the high-potential output terminal 6. Further, the configuration of the switching power supply is not limited to the falling voltage type shown in FIG. 1 and may be a rising voltage type or a rising-falling type.

The switching element 8 and the constant current element 9 are not limited to the GaN HEMTs. For example, the switching element 8 and the constant current element 9 may be semiconductor elements formed on a semiconductor substrate using a semiconductor having a wide bandgap (a wide bandgap semiconductor) such as silicon carbonate (SiC), gallium nitride (GaN), or diamond. The wide bandgap semiconductor means a semiconductor having a bandgap wider than the bandgap of gallium arsenide (GaAs) having a bandgap of about 1.4 eV. For example, the wide bandgap semiconductor includes semiconductors having bandgaps equal to or larger than 1.5 eV such as gallium phosphide (GaP, having a bandgap of about 2.3 eV), gallium nitride (GaN, having a bandgap of about 3.4 eV), diamond (C, having a bandgap of about 5.27 eV), aluminum nitride (AlN, having a bandgap of about 5.9 eV), and silicon carbide (SiC). If a withstanding voltage is set equal, since such a wide bandgap semiconductor element can be formed smaller than a silicon semiconductor element, parasitic capacitance is small and a high-speed operation is possible. Therefore, it is possible to reduce a switching period and reduce the sizes of winding components, capacitors, and the like.

Further, the illumination light source 16 is not limited to the LED and may be an EL or an OLED. Plural illumination light sources 16 may be connected to the lighting load 3 in series or in parallel.

In the examples explained in the embodiments, the illumination light source is used as the load of the switching power supply. However, the switching power supply is not limited to the illumination light source. A load driven by a direct current can be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching power supply comprising:
a first inductor;
a switching element configured to supply, if the switching element is on, a power supply voltage to the first inductor and feed an electric current;
a constant current element connected in series to the switching element and configured to turn off the switching element if the electric current of the switching element exceeds a predetermined upper limit;
a rectifying element connected in series to the switching element or the constant current element and configured to feed the electric current of the first inductor if the switching element is turned off;
a second inductor magnetically coupled to the first inductor and configured to have induced therein potential for turning on the switching element if the electric current of the first inductor increases, have induced therein potential for turning off the switching element if the electric current of the switching element decreases, and supply the induced potential to a control terminal of the switching element; and
a control circuit configured to supply the potential to a control terminal of the constant current element and output, if an average of the potential is lower than a lower limit for enabling the switching element to continue switching, pulse-like potential that repeats a period in which a potential value equal to or higher than the lower limit is output and a period in which a potential value lower than the lower limit is output.

2. The switching power supply according to claim 1, wherein the switching element is a normally-on element.

3. The switching power supply according to claim 1, wherein the control circuit outputs, if an average of generated potential is equal to or higher than the lower limit, pulse-like potential that repeats a period in which a potential value higher than the average is output and a period in which a potential value lower than the average is output.

4. The switching power supply according to claim 1, wherein the control circuit outputs direct-current potential if an average of output potential is higher than the lower limit.

5. The switching power supply according to claim 4, wherein a potential difference between relatively high potential and relatively low potential in the potential output by the control circuit is fixed irrespective of the average of the potential output by the control circuit.

6. The switching power supply according to claim 4, wherein, if the average of the output potential is higher than the lower limit, the control circuit changes, according to the average, a period in which a potential value higher than the average is output.

7. The switching power supply according to claim 4, wherein, if the average of the output potential is higher than the lower limit, the control circuit changes, according to the average, a period in which a potential value lower than the average is output.

8. The switching power supply according to claim 1, wherein the pulse-like potential changes in a sine waveform.

9. A luminaire comprising:
a switching power supply; and
a lighting load connected as a load circuit of the switching power supply,
the switching power supply including:
    a first inductor;
    a switching element configured to supply, if the switching element is on, a power supply voltage to the first inductor and feeds an electric current;
    a constant current element connected in series to the switching element and configured to turn off the switching element if the electric current of the switching element exceeds a predetermined upper limit;
    a rectifying element connected in series to the switching element or the constant current element and configured to feed the electric current of the first inductor if the switching element is turned off;
    a second inductor magnetically coupled to the first inductor and configured to have induced therein potential for turning on the switching element if the electric current of the first inductor increases, have induced therein potential for turning off the switching element if the electric current of the switching element decreases, and supply the induced potential to a control terminal of the switching element; and
    a control circuit configured to supply the potential to a control terminal of the constant current element and output, if an average of the potential is lower than a lower limit for enabling the switching element to continue switching, pulse-like potential that repeats a period in which a potential value equal to or higher than the lower limit is output and a period in which a potential value lower than the lower limit is output.

10. The luminaire according to claim 9, wherein the switching element is a normally-on element.

11. The luminaire according to claim 9, wherein the control circuit outputs, if an average of generated potential is equal to or higher than the lower limit, pulse-like potential that repeats a period in which a potential value higher than the average is output and a period in which a potential value lower than the average is output.

12. The luminaire according to claim 9, wherein the control circuit outputs direct-current potential if an average of output potential is higher than the lower limit.

13. A control method for a luminaire including a switching power supply and a lighting load connected as a load circuit of the switching power supply, the control method comprising supplying, if potential for controlling an output of the switching power supply is lower than a lower limit for enabling oscillation to be continued, pulse-like potential that repeats a period in which a potential value equal to or higher than the lower limit is output and a period in which a potential value lower than the lower limit is output.

14. The method according to claim 13, wherein
    the switching power supply includes a switching element and a constant current element connected in series to the switching element, and
    the potential for controlling the output of the switching power supply is potential of a control terminal of the constant current element.

15. The method according to claim 13, further comprising supplying, if an average of the potential for controlling the output of the switching power supply is equal to or higher than the lower limit, pulse-like potential that repeats a period in which a potential value higher than the average is output and a period in which a potential value lower than the average is output.

16. The method according to claim 13, further comprising supplying direct-current potential if an average of the potential for controlling the output of the switching power supply is higher than the lower limit.

17. The method according to claim 13, further comprising supplying, if an average of the potential for controlling the output of the switching power supply is higher than the lower limit, pulse-like potential that repeats a period in which potential is relatively high and a period in which potential is relatively low.

18. The method according to claim 17, wherein a potential difference between relatively high potential and relatively low potential in the potential for controlling the output of the switching power supply is fixed irrespective of the average of the potential output.

19. The method according to claim 17, further comprising changing, if the average of the potential for controlling the output of the switching power supply is higher than the lower limit, according to the average, a period in which a potential value higher than the average is output.

20. The method according to claim 17, further comprising changing, if the average of the potential for controlling the output of the switching power supply is higher than the lower limit, according to the average, a period in which a potential value lower than the average is output.

* * * * *